(12) United States Patent
Aerrabotu et al.

(10) Patent No.: US 7,539,186 B2
(45) Date of Patent: May 26, 2009

(54) PACKET FILTERING FOR EMERGENCY SERVICE ACCESS IN A PACKET DATA NETWORK COMMUNICATION SYSTEM

(75) Inventors: Naveen Aerrabotu, Gurnee, IL (US); Mark E. Pecen, Palatine, IL (US); Yilin Zhao, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/403,946

(22) Filed: Mar. 31, 2003

(65) Prior Publication Data

US 2004/0190522 A1    Sep. 30, 2004

(51) Int. Cl.
*H04L 12/56* (2006.01)
(52) U.S. Cl. .................................................. 370/389
(58) Field of Classification Search ................ 370/230, 370/231, 235, 310.1, 313, 328, 389, 392, 370/395.2; 455/403, 404, 405, 410, 411
See application file for complete search history.

(56) References Cited

U.S. PATENT DOCUMENTS

| | | | |
|---|---|---|---|
| 5,727,146 A * | 3/1998 | Savoldi et al. ................. 726/3 |
| 6,014,555 A | 1/2000 | Tendler | |
| 6,104,929 A | 8/2000 | Josse et al. | |
| 6,125,283 A * | 9/2000 | Kolev et al. .............. 455/552.1 |
| 6,240,462 B1 | 5/2001 | Agraharam et al. | |
| 6,571,092 B2 * | 5/2003 | Faccin et al. ............. 455/404.1 |
| 6,636,491 B1 | 10/2003 | Kari et al. | |
| 6,687,252 B1 | 2/2004 | Bertrand et al. | |
| 2002/0086659 A1 * | 7/2002 | Lauper ....................... 455/404 |
| 2002/0111159 A1 * | 8/2002 | Faccin et al. ................ 455/422 |
| 2002/0163906 A1 * | 11/2002 | Diachina et al. ............ 370/349 |
| 2003/0027554 A1 | 2/2003 | Haumont | |
| 2003/0126468 A1 * | 7/2003 | Markham .................... 713/201 |
| 2003/0211839 A1 * | 11/2003 | Baum et al. ................. 455/403 |

(Continued)

FOREIGN PATENT DOCUMENTS

WO    WO 02/080499 A1    10/2002

OTHER PUBLICATIONS

"3GPP Generation Partnership Project; Technical Specification Group Core Network; Packet Domain; Mobile Station (MS) Supporting Packet Switched Services" (3GPP TS 27.060), vol. 5.3.0, Dec. 2002, pp. 1-33.

(Continued)

*Primary Examiner*—Anh-Vu H Ly
(74) *Attorney, Agent, or Firm*—Randall S. Vaas

(57) ABSTRACT

A method and apparatus method of filtering packet data for an anonymous user device in a packet data network communication system includes a first step of initiating a call from an anonymous user device on a home network. A next step includes assigning an interim identity and interim IP address to the user device. A next step includes determining a level of service access of the data packets from the user device. A next step includes mapping the level of service access of the user device to the IP address. A next step includes defining permissible routing identities per the level of service access. A next step includes routing the data packets of the call along with the associated IP address to only those location addresses from the defining step.

22 Claims, 3 Drawing Sheets

U.S. PATENT DOCUMENTS

2004/0192251 A1* 9/2004 Zhao et al. ............... 455/404.1
2004/0242191 A1* 12/2004 Hossain et al. ........... 455/404.1
2005/0169208 A1 8/2005 Carrion-Rodrigo et al.
2006/0029084 A1 2/2006 Grayson

OTHER PUBLICATIONS

"3GPP Generation Partnership Project; Technical Specification Group Core Network; Mobile Radio Interface Layer 3 Specification; Core Network Protocols; Stage 3" (3GPP TS 24.008), vol. 6.0.0, Mar. 2003, pp. 1-18, 283-286, 295-299 and 415-429.
Submission in Support of a Request for Continued Examination for U.S. Appl. No. 10/437,667 (24 pages).
Final Office Action for U.S. Appl. No. 10/437,667 dated Aug. 28, 2007 (12 pages).
Amendment and Response for U.S. Appl. No. 10/437,667 dated Jun. 12, 2007 (8 pages).
Office Action for U.S. Appl. No. 10/437,667 dated Dec. 14, 2006 (10 pages).

* cited by examiner

PACKET FILTERING FOR EMERGENCY SERVICE ACCESS IN A PACKET DATA NETWORK COMMUNICATION SYSTEM

FIELD OF THE INVENTION

The present invention relates generally to wireless communications, and in particular, the present invention relates to filtering of packet data for a radiotelephone without a valid identity or without a proper authorization in a packet data network.

BACKGROUND OF THE INVENTION

In telecommunications systems, a mobile device includes hardware and software specific to a radio interface, along with subscriber specific data located in an identity module. For example, the Global System for Mobile Communications (GSM) system uses a subscriber identity module (SIM). The Universal Mobile Telephone Service (UMTS) and WCDMA, which is a third generation wireless network standard enhancing GSM, uses a Universal SIM (USIM). And the cdma2000 or cdmaOne system uses a Removable User Identity Module (R-UIM), which can all generally be referred to as SIM. The SIM can either be a smart card having physical dimensions similar to the well—known size of credit cards, or alternately can be"cut" to a much smaller format, commonly referred to as a 'plug-in SIM". In UMTS specifications, the term of universal integrated circuit card (UICC) is used. UICC is a physically secure device, an IC card (or 'smart card'), that can be inserted and removed from the terminal equipment. It may contain one or more applications. One of the applications may be a USIM. In either case, the SIM card contains and organizes information, such as identity information identifying the subscriber as a valid subscriber, subscriber supplied information, such as telephone numbers, for example, operator specific information, and a certain subset of mobility management state information, such as information about the last public land mobile network (PLMN) in which the mobile device was registered.

Normally, without an identity module in place, a call will not be accepted on a communication network. However, the Federal Communication Commission has mandated that a phone without an identity module, or even a phone number, must be able to place emergency calls (E911) in a communication system and must have an identifier. Moreover, a receiving call center must have the ability to callback the initiating device to confirm that the emergency call was legitimately placed, for resuming a suddenly dropped call, or for security reasons within the FCC mandated callback time which is usually forty-five minutes. This raises problems of how to contact a device without an identity. This problem is compounded in packet-switched network where individual packets must be addressed properly. Further, if an anonymously placed call is given a temporary identity to access a packet data network, then this opens an opportunity to the user of the anonymous device to access the network and to use services beyond the Emergency Packet Services or to use or receive services to which the subscriber is not allowed.

Techniques have recently become available for a mobile subscriber, either on GSM General Packet Radio Service (GPRS) and Enhanced Data for Global Evolution (EDGE), or on UMTS, to place an anonymous call, such as an emergency call, in either a circuit-switched or a packet-switched data domain without a SIM card. However, these techniques do not address the case where the temporarily addressed access for the anonymous device is left open after an emergency call is ended, leaving the possibility of further unauthorized access to or from the network.

Accordingly, what is needed is a method and apparatus for enabling the call connection and callback of anonymous user device in a packet-switched data domain while preventing further unauthorized use outside of the original purpose of the call.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENT

Figure 1:
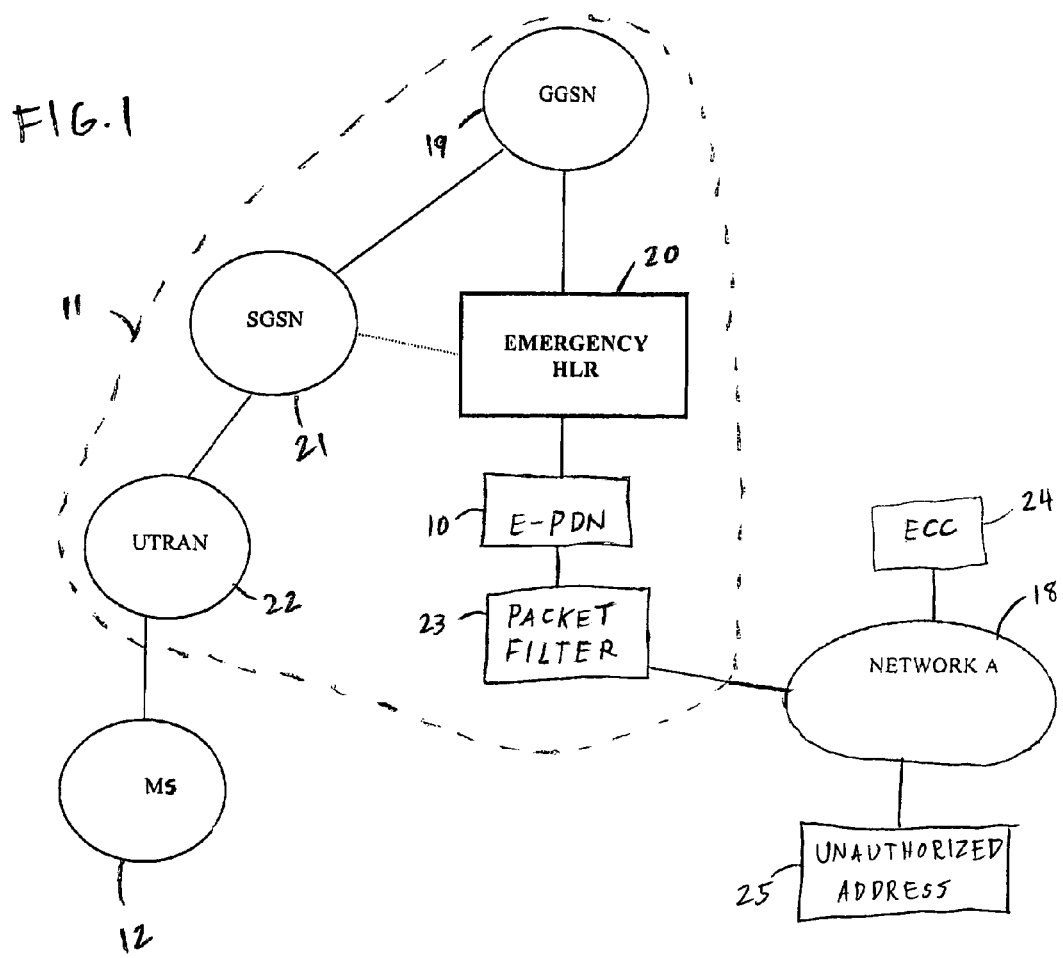
FIG. 1 shows a simplified schematic diagram of an anonymous mobile unit, networks, and called party, in accordance with the present invention.

The present invention provides a method and apparatus for enabling the call connection and callback of anonymous user device in a packet-switched data domain while preventing further unauthorized use outside of the original purpose of the call. The problems and issues seen with anonymous access are resolved in the present invention through the use of a packet filter associated with each public land mobile network (PLMN), as shown in FIG. 1. A packet data filter 23 of the network 11 controls authorized communication of a user device 12, such as a mobile station (MS) radiotelephone, even when the device does not have a valid identity. This is of particular importance where an temporary address is assigned to the MS, for a call to an Emergency Call Center (ECC) 24 for example, and address is left open after the emergency call is ended, which provides a communication pipe to and from the device 12 that is open to unauthorized addresses 25.

In the following discussion, a caller without a subscriber identity module (SIM) card is used. However, it should be clear from the description that the methods and apparatuses discussed are applicable or can be easily extended to the user with a SIM card or with a SIM card that is not registered. The present invention enables network access for an anonymous caller (i.e., with the absence of a SIM card) with a minimal impact on the existing standardized signaling protocol. An emergency or interim international mobile subscriber identity (IMSI) is generated in response to the SIM card not being positioned within the mobile user device so that the interim IMSI is utilized to provide identity information corresponding to the SIM card when the SIM card is not inserted within the mobile user device. This functionality is facilitated by the network, and particularly an Emergency Packet Data Network (E-PDN) 10, to provide an interim address for the anonymous caller in order to place a call, such as an emergency E911 call. The packet data filter 23 further restricts the call such that the anonymous device 12 can only transfer data packets with an authorized user, such as ECC 24. Although the packet data filter is shown as coupled to the E-PDN 10, the present invention works equally well with the packet filter 23 located anywhere in the network. For example, the packet filter could be part of the GGSN 19 or SGSN 21.

The interim address capabilities of the Emergency Packet Data Network 10 is incorporated within each PLMN 11. For example, the E-PDN 10 can be included within a Server GPRS Service Node (SGSN) 21 or preferably a Gateway GPRS Service Node (GGSN) 19 of the network 11. However, the E-PDN can be contained within other location such as an Emergency Home Location Register (HLR) 20 as described in WO 02/080499, "Method and Apparatus for Anonymous Network Access in the Absence of a Mobile Subscriber Identity Module", by Pecen et al., herein incorporated by reference.

The Emergency Packet Data Network 10 implements a set of IP addresses that can be assigned to an anonymous mobile 12 upon initiation of a call. This ability to assign IP addresses allows the packet data network to correctly forward data packets from an anonymous caller, between networks, to a called party, while also providing callback access across the networks. The E-PDN 10 also allows the service provider to isolate the Emergency Traffic from the rest, and provides flexibility for effective monitoring. The service providers can route this traffic, if-needed, with dedicated network entities. The E-PDN 10 can be combined in an Emergency HLR 20 or could be part of the GGSN or an equivalent in a CDMA-1X communication system. However, it should be recognized that the present invention has application in other systems, including GSM and CDMA systems, given the appropriately formatted MS identity assignments. The present invention provides particular application in allocating IP addresses from the E-PDN block when the mobile station subscriber does not have an identity (i.e., no SIM, R-UIM, USIM, phone number). However, the present invention can also be used even where a mobile station includes an identity (i.e., SIM, R-UIM, USIM, or at least a phone number).

Inasmuch as the mobile station does not have a subscriber identity in the application of the present invention, any assigned IP address must be matched to a particular user device. This is accomplished through the use of a unique International Mobile Equipment Identity (IMEI) code contained within the mobile unit itself, which could be the unit's serial number. In application, an emergency International Mobile Subscriber Identity (IMSI) is used as the mobile station (MS) identity in a GPRS attach procedure when the MS does not have a SIM. This Emergency IMSI consists of a unique pair of Mobile Country Code (MCC) and Mobile Network Code (MNC) as well as a set of pseudo-random bits containing a portion of the International Mobile Equipment Identity (IMEI). Note that the MCC number 901 and MNC number 08 can be used in the Emergency IMSI, in accordance with recommended procedures. The E-PDN then associates or maps the assigned IP address to the unit's IMSI or IMEI.

The Emergency IMSI would then be used to perform an Emergency GPRS Attach procedure in the packet-switched domain. The network operator would have full control over whether or not to enable this special emergency calling service, which is applicable in countries in which regulators require that a SIM card be used for emergency calls. The mobile user equipment would be granted a "special Emergency GPRS attach" of sorts, which would enable the mobile station to activate a special emergency signaling Packet Data Protocol (PDP) context. The emergency signaling PDP context would then be used for initiation of an emergency call in an Internet messaging system. In this case the mobile equipment would obtain an IP address for the emergency call from the E-PDN as part of the emergency signaling PDP context activation procedure. If the emergency call is to be placed via the Internet messaging subsystem, a Public User Identity in the format "user@host" can also be obtained for addressing. This Public User Identity would have the user part based on the Special Emergency IMSI and a predefined reserved domain name for the host's part indicating that this is an emergency call without a SIM.

The emergency signaling PDP context would be recognized by the Packet Filter, in that, the packet filter can check if the incoming IP address from the device belongs to the class of interim E-PDN IP addresses. If so, the packet filter then would regulate packet flow, which could only be used for Internet Messaging (IM) subsystem signaling since all traffic on this context would only be allowed to go to the Emergency Calling Center (ECC), ensuring that only emergency calls could be placed using this PDP context. If not, the packet filter could block the flow, redirect the flow to a third party for review, or restrict the flow using level of service rules. The ECC could utilize the IP address information (or Public User Identity) to optionally filter out multiple false emergency calls being made by the same mobile without a SIM in order to prevent denial of service type attacks on the ECC. Moreover, the ECC could utilize the IP address information (or Public User Identity) to callback the mobile device if the call is dropped to confirm the legitimacy of the emergency.

Figure 2:
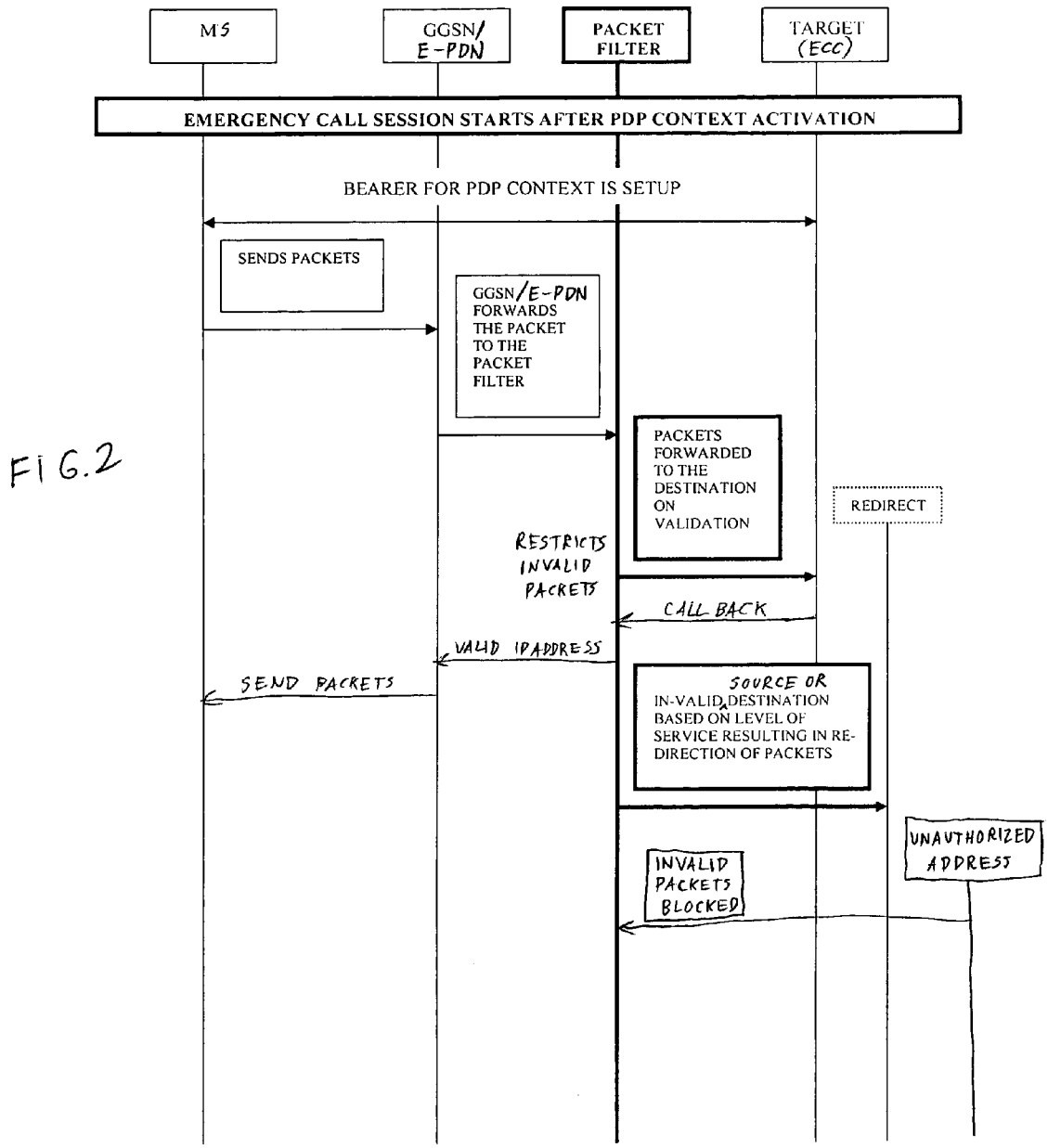
FIG. 2 illustrates the interaction between a mobile unit and a network, in accordance with the present invention.

Referring to FIGS. 1 and 2, an example will be shown below where a mobile station makes an emergency call. It is assumed that the mobile station has no identity, such as a SIM card or even a phone number. The mobile station 12 initiates the packet data emergency call by attaching to a UMTS Terrestrial Radio Access Network (UTRAN) 22, and activating a PDP context request with the SGSN 21. The MS initiates the GPRS attach procedure by the transmission of an Attach Request message to the SGSN 21. If the MS is unidentified in the SGSN, the SGSN sends an Identity Request (Identity Type=Emergency IMSI) to the MS. The MS responds with Identity Response (Emergency IMSI). An alternative is for the MS to include the Emergency IMSI whenever it begins to initiate the emergency call.

The mobile user device includes an interim identity generator for generating the interim International Mobile Subscriber Identity (IMSI), and a SIM detector for detecting the presence of a SIM card within the user device. The user device also includes a memory for storing local information, such as local information containing an international mobile equipment identity (IMEI) corresponding to the user device, local information including an electronic serial number of the user device, local information also containing the IMSI (or setting IMSI=serial number), and interim or emergency IP address information received from the E-PDN.

The SIM detector detects the presence of SIM card within the user device, and informs the interim identity generator when the SIM card is not positioned within the user device. As a result, according to the present invention, when the SIM card is not inserted within the user device, the interim identity generator generates an interim International Mobile Subscriber Identity (IMSI), which is then available to a radio interface layer signaling stack of the user device in the absence of the SIM card. This generated interim IMSI would then be used to perform an anonymous IMSI GPRS attach procedure in the packet-switched domain, as described above. An operator of a radio access network would have full control over whether or not to enable the anonymous calling procedure, such as for emergency calling service for example, and which is applicable in countries in which regulators require that SIM card be used for emergency calls. Optionally, the mobile user device can be granted a special anonymous GPRS attach of sorts, which would enable mobile user device to receive data calls as well.

The generated interim INISI of the present invention would conform to the length characteristics of a known IMSI, and is therefore up to fifteen digits in length and is encoded as a series of four-bit quantities. For example, the interim identity generator can generate an interim IMSI that includes an interim mobile country code (MCC), and an interim mobile network code (MNC), along with a set of pseudo-random digits. According to the present invention, the interim mobile country code and interim mobile network code correspond respectively to a predetermined unused mobile country code and a predetermined unused mobile network code. The pseudo-random digits contain, for example, a portion of the international mobile equipment identity (IMEI) associated with mobile user device, and in this manner the call could be traced to an equipment owner.

Upon receipt of the interim or emergency identity (IMSI), the SGSN 21 establishes a PDP context for the mobile station 12 with the GGSN 19 including the interim or emergency identity. The GGSN acknowledges the PDP Context, and the Emergency Packet Data Network, residing in the GGSN in this example, acknowledges the emergency identity, and allocates an IP address from a predetermined list therein and maps it to the emergency identity. The E-PDN then stores this mapped IP address/identity. Optionally, the E-PDN returns the IP address associated with the interim identity to the user device 12 for storage therein.

The emergency call can then be setup between the GGSN/ E-PDN and an Emergency Call Center using the IP address, whereupon a pipe (bearer) for the PDP context is setup for the transfer of packet data from the device to the target destination (e.g., ECC). The mobile station (MS) sends its first emergency call packets to the network (GGSN/E-PDN). Since the user device does not have a valid identity, an interim IP address is assigned (by the E-PDN), as described above. The GGSN then forwards the packets with the assigned interim IP address to the Packet Filter. The Packet Filter checks to see if the call is not-authorized (e.g., not an emergency, presence of an adult supervision block, etc.) and if the incoming IP address from the device belongs to the class of interim E-PDN IP addresses. If the call is invalid for having an improper authorization or source IP address, then the packets are restricted to a predetermined level of service access, blocked, and/or redirected to an authorized third party (e.g., parents, police) for review. However, if the call is validated for being authorized and having a valid interim IP address, the packet networks are directed to forward the packet data along with the interim IP address to the address of a known target destination (e.g., ECC), depending on the class of the call (e.g., emergency). The call is completed normally through the networks 11, 18 to the emergency call center 24 (e.g., though a public switched telephone network) using known procedures for the GPRS/UMTS system with the assigned interim IP address for the MS.

At this point, the emergency call session proceeds normally. In detail, the user device 12 transmits packet-switched data (VoIP) through the air interface to, and receives packet-switched data through the air interface from, the radio access network 22. The packet-switched data received from the user device 12 is transmitted by the radio access network 22 to a Serving GPRS Support Node (SGSN) 21, which then transmits the packet-switched data to a Gateway GPRS Support Node (GGSN) 19. GGSN 19 converts the packet-switched data from a domain associated with the radio access network 22 to a domain associated with a packet data network (not shown) and transmits the converted packet-switched data to the packet data network for connection to an Emergency Call Center (ECC) 24. Similarly, a callback using packet-switched data received from the ECC 24 though the packet data network 10 is converted by the GGSN 19 from the domain associated with packet data network 10 to the domain associated with the radio access network 22. The converted packet-switched data is then transmitted from the GGSN 19 to the radio access network 22 through the SGSN 21. The radio access network 22 then transmits the packet-switched data to the mobile user device 12 along the air interface.

When the call is disconnected or ended, the ECC is able to callback to the interim IP address of the mobile that originally initiated the emergency call. This can be done to determine if the emergency is legitimate, as is necessary under FCC rules, to obtain further information, or to resume a suddenly dropped call. The ECC will route the call to the last known PLMN. As the network and packet filter are familiar with the emergency IP addresses on the E911 system, the packet filter and network will recognize the callback as being from a valid IP address, and send the callback packets to the anonymous user device assigned to that interim IP address.

However, if there is an attempt by an unauthorized address to send information to the interim IP address, the packet filter 23 will recognize that the incoming IP address is not one of the known emergency IP addresses used in the original call and can block the invalid packets from reaching the user device 12. This provides an advantage since the ending of the emergency call does not necessary close the data pipe to the MS 12, and information from any other source could access the user device 12 through the interim IP address without the packet filter 23 being there to prevent this unauthorized use. The same packet filter 23 can also used to filter the unauthorized use from the user device 12 to an unauthorized address.

As shown in FIG. 2, it is preferred that the packet filter functionality is separated from the GGSN, as the packet filter should to be separated from the GGSN application functionalities. Therefore, the GGSN and packet filter are two separate entities in the network with different responsibilities.

Figure 3:
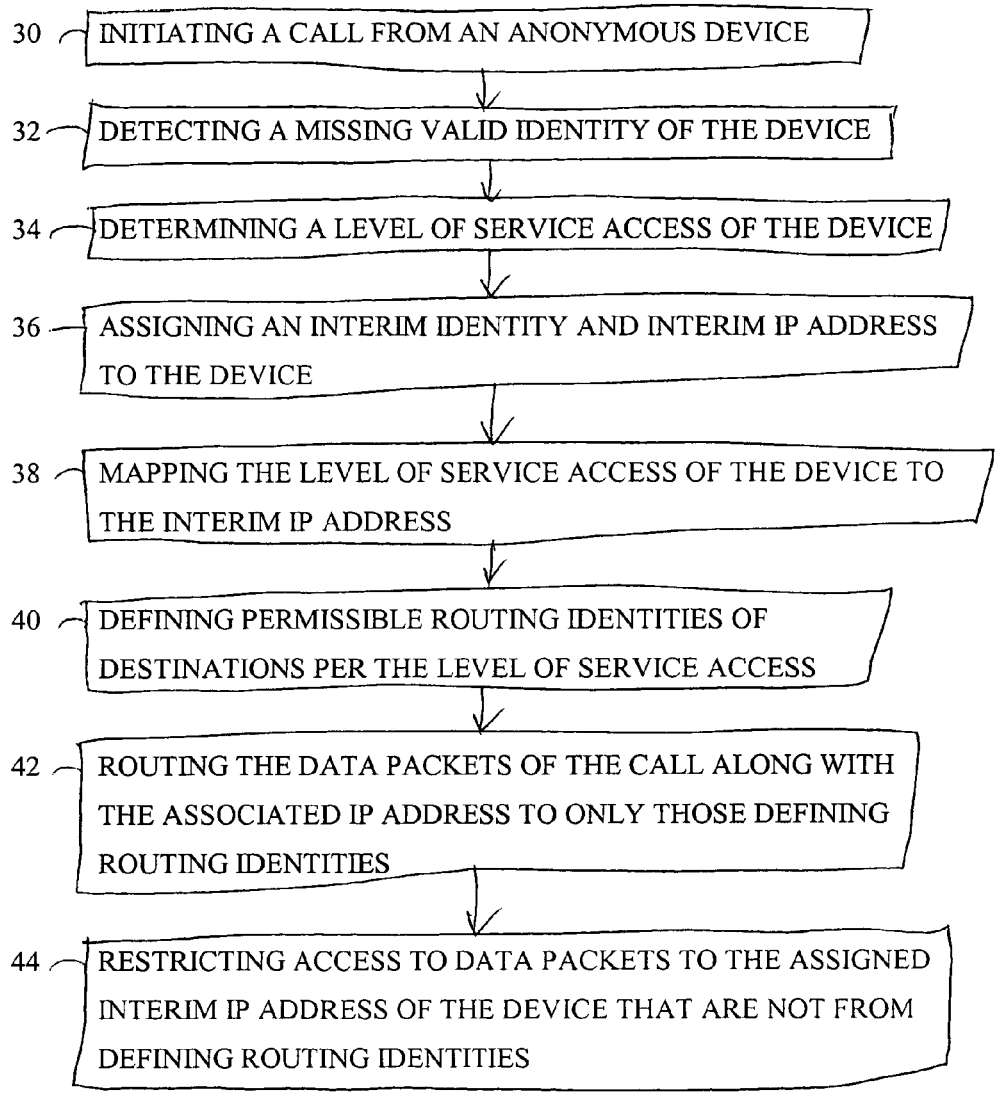
FIG. 3 illustrates a flow chart of method of anonymous operation, in accordance with the present invention.

FIG. 3 is a data flow diagram for a method of filtering packet data for an anonymous user device in a packet data network communication system, in accordance with the present invention. As illustrated, a first step 30 includes initiating a call from an anonymous user device on a home network. If the user device does not have a SIM card, an interim equipment identity, such as an emergency identity (IMSI or IMEI), is generated.

A next step includes detecting 32 a missing identity of the user device by the home network. The network determines whether a valid identity is missing and whether the particular call is an emergency and should be allowed. Allowability is found by determining 34 a level of service access (e.g. emergency access) of the data packets from the user device. If the anonymous call is allowed, a next step 36 includes allocating or assigning an interim identity and interim IP address to the user device, such as an emergency IP address assigned by the E-PDN from a predetermined list, as explained above. The E-PDN is associated with the network and is preferably contained within a Gateway GPRS Service Node (GGSN) of the packet data network. Optionally, the emergency packet data network communicates with a GGSN of the packet data network through an emergency home location register (HLR). The interim IP address is mapped 38 to the equipment identity of the user device and stored.

The permissible target destination of the call is defined 40 per the level of service access granted. For example, if the call is an emergency call, it can only be routed to known identities (i.e., IP addresses) of predetermined emergency calling centers (ECCs). In addition, the present invention provides that the interim IP address of the user device can only be accessed (i.e., called back) by the IP address of the ECC that was called. The packet filter performs this function by restricting access to data packets addressed to the assigned interim IP address of the anonymous user device that are not from a defined routing identity (ECC). Preferably, the packet filter is separate from a Gateway GPRS Service Node (GGSN) of the packet data network due to different functionalities. At this time, the packets of the call can be routed 42 with the associated interim identity of the user device to only those target destinations defined in step 40 above, such as the Emergency Call Center, and the call can proceed as normal.

The present invention has effect limiting the service access of an anonymous user device, such that the user device can only communicate with a predefined target destination. All other unauthorized (i.e., not having the proper level of service access) data packets, to or from the user device, are blocked or restricted. Moreover, the present invention provides that the blocked or restricted data packets of the restricting step 44 are redirected for reviewing by a third party.

As a result, the present invention enables an anonymous call and callback for a specific purpose on a data packet network. Such data calls for example, occur for a third generation wireless mobile subscriber in the packet-switched data domains, while having minimum impact on the mobile device and network equipment, while at the same time offering a fairly wide range of access and service provision control options. Moreover, the present invention takes account of unauthorized network usage.

The present invention uses the emergency call without SIM as an example for detailed description. It should be obvious to those skilled in the art that the methods and apparatuses discussed are applicable or can be easily extended to the user with a SIM card or with a SIM card but not registered. Furthermore, the methods and apparatuses are applicable to any packed-switched systems.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the broad scope of the invention.

What is claimed is:

1. A method for communicating data packets for an anonymous user device in a packet data network communication system, the method comprising:
   receiving an emergency call attach request from the user device) the emergency call attach request including an identity for the user device;
   determining whether the identity for the user device is a valid identity for the packet data network communication system;
   in the event that the identity for the user device is not a valid identity for the packet data network communication system:
      setting a level of service access for the user device to emergency service access only,
      granting the emergency call attach request,
      establishing a PDP context for an emergency call,
      assigning an interim IP address to the user device for emergency service access only, and
      determining at least one authorized IP address that is permitted to send data packets to and receive data packets from the interim IP address while the PDP context for the emergency call is active, wherein the PDP context for the emergency call remains active through a predetermined callback period and wherein the at least one authorized IP address corresponds to at least one device used to provide communication for emergency services in response to the emergency call;
   receiving data packets directed to the interim IP address while the PDP context for IP emergency call is active;
   determining source IP addresses for the received data packets;
   in the event that a received data packet includes a source IP address which corresponds to the at least one authorized IP address, routing the received data packet to the interim IP address;
   in the event that a received data packet includes a source IP address which does not correspond to the at least one authorized IP address, redirecting the received data packet to a third party to thereby prohibit communication between the interim IP address and unauthorized source IP addresses while the PDP context for the emergency call is active; and
   upon termination of the PDP context for the emergency call, prohibiting communication of data packets to or from the user device in the event that the identity for the user device is not a valid identity for the packet data network communication system.

2. The method of claim 1, wherein the at least one authorized IP address is limited to IP addresses corresponding to emergency call centers.

3. The method of claim 1, wherein the step of assigning comprises:
   assigning an interim IP address to the user device from a stored list of interim IP addresses.

4. A method for communicating data packets for an anonymous user device in a packet data network communication system, the method comprising:
   receiving an emergency call attach request from the user device, the emergency call attach request including an identity for the user device;
   determining whether the identity for the user device is a valid identity for the packet data network communication system;
   in the event that the identity for the user device is not a valid identity for the packet data network communication system:
      setting a level of service access for the user device to emergency service access only,
      granting the emergency call attach request,
      establishing a PDP context for an emergency call,
      assigning an interim IP address to the user device for emergency service access only, and
      determining at least one authorized IP address that is permitted to send data packets to and receive data packets from the interim IP address while the PDP context for the emergency call is active, wherein the PDP context for The emergency call remains active through a predetermined callback period and wherein the at least one authorized IP address corresponds to at least one device used to provide communication for emergency services in response to the emergency call;
   receiving data packets from the user device while the PDP context for the emergency call is active;
   determining destination IP addresses for the received data packets;
   in the event that a received data packet includes a destination IP address which corresponds to the at least one authorized IP address, routing the received data packet to the destination IP address;

in the event that a received data packet includes a destination IP address which does not correspond to the at least one authorized IP address, blocking the received data packet from being delivered to the destination IP address to thereby prohibit communication between the interim IP address and unauthorized destination IP addresses while the PDP context for the emergency call is active; and upon termination of the PDP context for the emergency call, prohibiting communication of data packets to or from the user device in the event that the identity for the user device is not a valid identity for the packet data network communication system.

5. The method of claim 1, wherein the identity for the user device includes at least part of an International Mobile Equipment Identity (IMEI) code stored within the user device.

6. The method of claim 1, wherein the packet data network communication system utilizes a General Packet Radio Service (GPRS) protocol and wherein an Emergency Packet Data Network (E-PDN) isolates emergency traffic from non emergency traffic in the packet data network communication system.

7. The method of claim 1, further comprising:

receiving additional data packets from the user device while the PDP context for the emergency call is active;

determining destination IP addresses forte additional received data packets;

in the event that an additional received data packet includes a destination IP address which corresponds to the at least one authorized IP address, routing the additional received data packet to the destination IP address; and in the event that an additional received data packet includes a destination IP address which does not correspond to the at least one authorized IP address, redirecting the additional received data packet to a third party to thereby prohibit communication between the interim IP address and unauthorized destination IP addresses while the PDP context for the emergency call is active.

8. The method of claim 1, wherein the packet data network communication system utilizes a Universal Mobile Telephone Service (UMTS) protocol and wherein an Emergency Packet Data Network (E-PDN) isolates emergency traffic from non emergency traffic in the packet data network communication system.

9. The method of claim 4, further comprising:

receiving additional data packets directed to the interim IP address while the PDP context for the emergency call is active;

determining source IP addresses for the additional received data packets;

in the event that an additional received data packet includes a source IP address which corresponds to the at least one authorized IP address, routing the additional received data packet to the interim IP address; and in the event that an additional received data packet includes a source IP address which does not correspond to the at least one authorized IP address, blocking the additional received data packet from being delivered to the interim IP address to thereby prohibit communication between the interim IP address and unauthorized source IP addresses while the PDP context for the emergency call is active.

10. A method for communicating data packets for an anonymous user device in a packet data network communication system, the method comprising:

receiving an emergency call attach request from the user device, the emergency call attach request including an identity for the user device;

determining whether the identity for the user device is a valid identity for the packet data network communication system;

in the event that the identity for the user device is not a valid identity for the packet data network communication system:

setting a level of service access for the user device to emergency service access only, granting the emergency call attach request, establishing a PDP context for an emergency call, assigning an interim IP address to the user device for emergency service access only, and determining at least one authorized IP address that is permitted to send data packets to and receive data packets from the interim IP address while the PDP context for the emergency call is active, wherein the PDP context for the emergency call remains active through a predetermined callback period and wherein the at least one authorized IP address corresponds to at least one device used to provide communication for emergency services in response to the emergency call;

receiving data packets from the user device while the PDP context for the emergency call is active;

determining destination IP addresses for the received data packets;

in the event that a received data packet includes a destination IP address which corresponds to the at least one authorized IP address, routing the received data packet to the destination IP address;

in the event that a received data packet includes a destination IP address which does not correspond to the at least one authorized IP address, redirecting to a third party the received data packet to thereby prohibit communication between the interim IP address and unauthorized destination IP addresses while the PDP context for the emergency call is active; and upon termination of the PDP context for the emergency call, prohibiting communication of data packets to or from the user device in the event that The identity (hr the user device is not a valid identity for the packet data network communication system.

11. A method for communicating data packets for an anonymous user device in a packet data network communication system, the method comprising:

receiving an emergency call attach request from the user device, the emergency call attach request including an identity for the user device;

determining whether the identity for the user device is a valid identity for the packet data network communication system;

in the event that the identity for the user device is not a valid identity for the packet data network communication system:

setting a level of service access for the user device to emergency service access only, granting the emergency call attach request, establishing a PDP context for an emergency call, assigning an interim IP address to the user device for emergency service access only, and determining at least one authorized IP address that is permitted to send data packets to and receive data packets from the interim IP address while the PDP context for the emergency call is active, wherein the PDP context for the emergency call remains active through a predetermined callback period and wherein the at least one authorized IP address corresponds to at least one device used to provide communication for emergency services in response to the emergency call;

receiving data packets directed to the interim IP address while the PDP context for the emergency call is active;

determining source IP addresses for the received data packets;

in the event that a received data packet includes a source IP address which corresponds to the at least one authorized IP address, routing the received data packet to the interim IP address;

in the event that a received data packet includes a source IP address which does not correspond to the at least one authorized IP address, blocking the received data packet from being delivered to the interim IP address to thereby prohibit communication between the interim IP address and unauthorized source IP addresses while the PDP context for the emergency call is active; and upon termination of the PDP context for the emergency call, prohibiting communication of data packets to or from the user device in the event that the identity for the user device is not a valid identity for the packet data network communication system.

12. A method of communicating data packets for an anonymous user device in a packet data network communication system, the method comprising:

receiving an emergency call attach request from the user device, the emergency call attach request including an identity for the user device;

determining whether the identity for the user device is a valid identity for the packet data network communication system;

in the event that the identity for the user device is not a valid identity for the packet data network communication system:
  granting the emergency call after each request,
  requesting and receiving an interim identity from the user device, the interim identity having been generated by the user device,
  establishing a PDP context for an emergency call,
  setting a level of service access for the user device to emergency service access only,
  assigning an interim IP address to the user device for emergency service access only,
  associating the interim IP address with the interim identity generated by the user device,
  mapping the level of service access of the user device to the interim IP address, and
  determining at least one authorized IP address that is permitted to send data packets to and receive data packets from the interim IP address while the PDP context for the emergency call is active, wherein the PDP context for the emergency call remains active through a predetermined callback period and wherein the at least one authorized IP address corresponds to at least one emergency calling center;

receiving data packets directed to the interim IP address while the PDP context for the emergency call is active;

determining source IP addresses for the received data packets;

in the event that a received data packet includes a source IP address which corresponds to an IP address of an emergency calling center, routing the received data packets to the interim IP address;

in the event that a received data packet includes a source IP address which does not correspond to an IP address of an emergency calling center, restricting delivery of the received data packets to the interim IP address to thereby prohibit communication between the interim IP address and unauthorized source IP addresses while the PDP context for the emergency call is active;

receiving additional data packets from the user device while the PDP context for the emergency call is active;

determining destination IP addresses for the additional received data packets;

in the event that an additional received data packet includes a destination IP address which corresponds to an IP address of an emergency calling center, routing the additional received data packets to the destination IP address;

in the event that an additional received data packet includes a destination IP address which does not correspond to an IP address of an emergency calling center, restricting delivery of the additional received data packets to the destination IP address to thereby prohibit communication between the interim IP address and unauthorized destination IP addresses while the PDP context for the emergency call is active; and upon termination of the PDP context for the emergency call, prohibiting communication of data packets to or from the user device in the event that the identity for the user device is not a valid identity for the packet data network communication system.

13. The method of claim 12, wherein the step of restricting delivery of the received data packets further comprises redirecting the received data packets for review by a third party.

14. The method of claim 12, wherein the step of restricting delivery of the received data packets further comprises:
  blocking the received data packets from being delivered to the interim IP address.

15. The method of claim 12, further comprising:
  determining a level of service for the received data packets; and
  blocking the received data packets from being delivered to the interim IP address in the event that the level of service for the received data packets is a level of service other than emergency service access.

16. The method of claim 12, wherein the steps of routing the received data packets and restricting delivery of the received data packets are performed by a packet filter that is separate from a Gateway GPRS Service Node (GGSN) of the packet data network communication system.

17. A packet data communication system that facilitates emergency communications by an anonymous user device, the communication system comprising:
  a home packet data network operable to:
    receive an emergency call attach request from the user device,
    determine whether the emergency call attach request includes a valid identity of the user device for use on the home packet data network,
    request and receive an interim identity from the user device and set a level of service access for the user device to emergency service access only in the event that the emergency call attach request does not include a valid identity for use on the home packet data network,
    establish a PDP context for an emergency call responsive to the emergency call attach request wherein the PDP context for the emergency call remains active through a predetermined callback period, and
    prohibit communication of data packets to or from the user device upon termination of the PDP context for the emergency call in the event that the emergency call attach request does not include a valid identity for use on the home packet data network;

an emergency packet data network coupled to the home packet data network, the emergency packet data network being operable to:
　assign an interim IP address to the user device for emergency service access only and associate the interim IP address with the interim identity of the user device,
　determine at least one authorized IP address that is permitted to send data packets to and receive data packets from the interim IP address while the PDP context for the emergency call is active,
　route to the at least one authorized IP address data packets that include the interim IP address and are received while the PDP context for the emergency call is active; and
　route to the interim IP address data packets that include the at least one authorized IP address and are received while the PDP context for the emergency call is active; and a packet filter coupled to at least one of the home packet data network and the emergency packet data network, the packet filter operable while the PDP context for the emergency call is active to pass only those data packets that include both the interim IP address and the at least one authorized IP address and to at least block all data packets that include the interim IP address but not the at least one authorized IP address to thereby prohibit communication between the interim IP address and unauthorized IP addresses while the PDP context for the emergency call is active.

18. The packet data communication system of claim 17, wherein the packet filter is further operable to redirect blocked data packets for review by a third party.

19. The packet data communication system of claim 17, wherein the at least one authorized IP address corresponds to at least one emergency calling center.

20. The packet data communication system of claim 17, wherein the home packet data network includes a Gateway GPRS Service Node (GGSN) mid wherein the packet filter is separate from the GGSN of the home packet data network.

21. The packet data communication system of claim 17, wherein the home packet data network includes a Gateway GPRS Service Node (GGSN) mid wherein the emergency packet data network is contained within the GGSN of the home packet data network.

22. A packet data communication system that facilitates emergency communications, the communication system comprising:
　an anonymous user device;
　a home packet data network operable to:
　　receive an emergency call attach request from the user device,
　　determine whether the emergency call attach request includes a valid identity of the user device for use on the home packet data network,
　　request and receive an interim identity from the user device and set a level of service access for the user device to emergency service access only in the event that the emergency call attach request does not include a valid identity for use on the home packet data network,
　　establish a PDP context for an emergency call responsive to the emergency call attach request, wherein the PDP context for the emergency call remains active through a predetermined callback period, and
　　prohibit communication of data packets to or from the user device upon termination of the PDP context for the emergency call in the event that the emergency call attach request does not include a valid identity for use on the home packet data network;

an emergency packet data network coupled to the home packet data network, the emergency packet data network being operable to:
　assign an interim IP address to the user device for emergency service access only and associate the interim IP address with the interim identity of the user device,
　determine at least one authorized IP address that is permitted to send data packets to and receive data packets from the interim IP address while the PDP context for the emergency call is active,
　route to the at least one authorized IP address data packets that include the interim IP address and are received while the PDP context for the emergency call is active, and
　route to the interim IP address data packets that include the at least one authorized IP address and are received while the PDP context for the emergency call is active; and a packet filter coupled to at least one of the home packet data network and the emergency packet data network, the packet filter operable while the PDP context for the emergency call is active to pass only those data packets that include both the interim IP address and the at least one authorized IP address and to at least block all data packets that include the interim IP address but not the at least one authorized IP address to thereby prohibit communication between the interim IP address and unauthorized IP addresses while the PDP context for the emergency call is active.

* * * * *